US009341697B2

(12) United States Patent
Mahajan et al.

(10) Patent No.: US 9,341,697 B2
(45) Date of Patent: May 17, 2016

(54) MOVING PLATFORM ORIENTATION TRACKING SYSTEM

(75) Inventors: Milind Mahajan, Thousand Oaks, CA (US); Bruce K. Winker, Ventura, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 0 days.

(21) Appl. No.: 13/531,918

(22) Filed: Jun. 25, 2012

(65) Prior Publication Data

US 2013/0342841 A1 Dec. 26, 2013

(51) Int. Cl.
*G01J 4/00* (2006.01)
*G01S 1/70* (2006.01)
*G01S 17/42* (2006.01)
*G01S 17/74* (2006.01)
*G01S 3/783* (2006.01)
*G01S 7/499* (2006.01)

(52) U.S. Cl.
CPC . *G01S 1/70* (2013.01); *G01S 3/783* (2013.01); *G01S 7/499* (2013.01); *G01S 17/42* (2013.01); *G01S 17/74* (2013.01)

(58) Field of Classification Search
CPC ....... G01B 11/002; G01S 7/499; G01S 17/66; F41G 7/30
USPC ............... 356/364, 369, 138, 139.03–139.08, 356/614, 623; 250/203.1, 203.6; 702/150–154
See application file for complete search history.

(56) References Cited

U.S. PATENT DOCUMENTS

| | | | | |
|---|---|---|---|---|
| 3,522,433 A | * | 8/1970 | Houghten | 398/122 |
| 3,594,085 A | | 7/1971 | Wilmanns | 356/114 |
| 4,097,007 A | * | 6/1978 | Fagan et al. | 244/3.11 |
| 4,256,368 A | * | 3/1981 | Task | 359/489.09 |
| 4,318,591 A | | 3/1982 | Elterman | 350/374 |
| 4,520,362 A | | 5/1985 | Charlot | 343/361 |
| 5,007,692 A | | 4/1991 | Matsuura | 350/6.8 |
| 5,042,951 A | | 8/1991 | Gold et al. | 356/369 |
| 5,200,606 A | | 4/1993 | Krasutsky et al. | 250/216 |
| 5,218,582 A | * | 6/1993 | Marchant | 369/110.04 |
| 5,259,567 A | * | 11/1993 | Jano et al. | 244/3.11 |
| 5,272,351 A | | 12/1993 | Andressen | 250/561 |
| 5,344,099 A | | 9/1994 | Pittman et al. | 244/3.13 |
| 5,574,479 A | | 11/1996 | Odell | 345/158 |
| 5,757,671 A | | 5/1998 | Drevillon et al. | 364/525 |
| 8,009,292 B2 | | 8/2011 | Choi et al. | 356/369 |
| 8,169,612 B2 | | 5/2012 | Gao | 356/369 |
| 2004/0200947 A1 | * | 10/2004 | Lau | 250/202 |
| 2006/0192961 A1 | * | 8/2006 | Smith et al. | 356/364 |
| 2006/0227422 A1 | * | 10/2006 | Monacelli et al. | 359/485 |
| 2008/0316463 A1 | * | 12/2008 | Okada et al. | 356/4.01 |
| 2010/0052981 A1 | * | 3/2010 | Alexander et al. | 342/357.06 |
| 2010/0328644 A1 | * | 12/2010 | Lu et al. | 356/5.01 |
| 2011/0102793 A1 | * | 5/2011 | Straaijer | 356/369 |

* cited by examiner

*Primary Examiner* — Tri T Ton
(74) *Attorney, Agent, or Firm* — Koppel, Patrick, Heybl & Philpott

(57) ABSTRACT

An orientation tracking system for a moving platform includes a transmitter which generates an beam having a known polarization with respect to a predefined coordinate system. The moving platform includes an ellipsometric detector capable of detecting the polarized beam when within the line-of-sight of the transmitter, and measuring its polarization state. The polarization state indicates the rotational orientation of the moving platform with respect to the predefined coordinate system. The beam could also be used to convey guidance commands to the platform.

26 Claims, 2 Drawing Sheets

MOVING PLATFORM ORIENTATION TRACKING SYSTEM

BACKGROUND OF THE INVENTION

1. Field of the Invention

This invention relates generally to techniques for determining the rotational orientation and spatial location of a platform moving in space.

2. Description of the Related Art

It is often necessary to know the rotational orientation of a moving body or platform, along with its spatial location. For example, it may be necessary to know the orientation of a moving projectile such as a missile in order to provide the missile with appropriate guidance data.

Several techniques are used to provide rotational orientation data of this sort. For example, it may be possible to determine the orientation of a moving platform by means of a radar system. However, such systems tend to be large and costly; they also consume a large amount of power and are easy to detect. Another approach is to affix accelerometers, gyroscopes, magnetometers etc. to the platform; however, these devices also tend to be expensive, bulky and complex.

It may also be possible to determine the rotational orientation of a moving platform by imaging it as it moves. However, this is likely to be difficult if conditions are turbulent or otherwise less than ideal, and may be impossible if the projectile is small and rapidly spinning.

SUMMARY OF THE INVENTION

An orientation tracking system for a moving platform is presented which addresses several of the problems noted above, providing a robust, compact, low cost means of determining the rotational orientation of a moving platform.

The present moving platform orientation measurement system includes a transmitter which generates a beam of electromagnetic radiation having a known polarization with respect to a predefined coordinate system. The moving platform includes an ellipsometric detector capable of detecting the polarized beam when within the line-of-sight of the transmitter, and measuring its polarization state. The polarization state indicates the rotational orientation of the moving platform with respect to the predefined coordinate system.

The beam is a preferably a linearly polarized laser beam. The system may further include a phase-locked-loop (PLL) circuit coupled to the ellipsometric detector and arranged to track the rotational orientation and thereby mitigate the degradation in the accuracy of the rotational orientation determination that might otherwise occur when the link between the transmitter and moving platform is disrupted.

The beam may be pulsed, and the moving platform may be arranged to reflect the beam; then, the system may include a means of measuring the transit time of the pulses from the transmitter to the moving platform and back, such that the range of the moving platform with respect to the transmitter can be determined. Guidance commands might be encoded into the pulses, with the platform arranged to vary its trajectory in response to the guidance commands.

These and other features, aspects, and advantages of the present invention will become better understood with reference to the following drawings, description, and claims.

DETAILED DESCRIPTION OF THE INVENTION

Figure 1A:
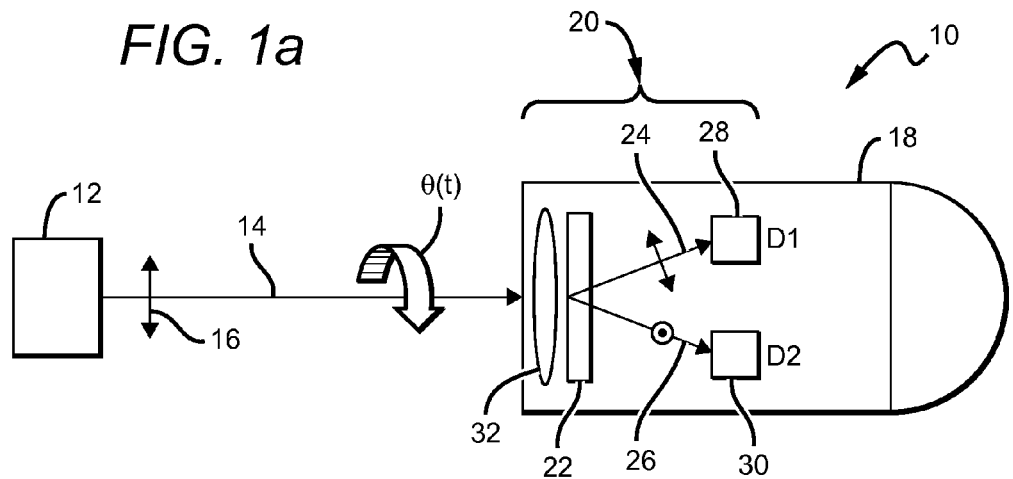
FIG. 1a is a block diagram of an orientation measurement system in accordance with the present invention.

The basic principles of an orientation measurement system for a moving platform per the present invention are illustrated in FIG. 1a. The system 10 includes a transmitter 12 which generates a beam of electromagnetic radiation 14 having a known polarization 16 with respect to a predefined coordinate system. The moving platform, here a projectile 18, includes an ellipsometric detector 20 capable of detecting polarized beam 14 when within the line-of-sight of transmitter 12. Ellipsometric detector 20 is arranged to measure the polarization state of the detected beam, which is used to indicate the rotational orientation θ of projectile 18 with respect to the predefined coordinate system. It is preferred that transmitter 12 be an optical transmitter and that beam 14 be an optical beam; however, it would be obvious to those skilled in the art that beam 14 can comprise other parts of the electromagnetic spectrum, such as millimeter waves, radio waves, etc. It is also preferred that the polarized beam have a polarization extinction ratio of >2:1.

The beam 14 is preferably a linearly polarized laser beam. Ellipsometric detector 20 preferably comprises a polarizing beamsplitter 22, which splits a detected polarized beam into first and second components (24, 26) having orthogonal polarizations, the amplitudes of which vary with the polarization state of the detected beam. Ellipsometric detector 20 also includes first and second detectors 28, 30, which are arranged to receive first and second components 24 and 26, respectively, and to generate respective outputs (D1, D2) that vary with the intensities of their received components, with D1+D2 proportional to the total amplitude of the detected beam.

When so arranged, the output D1 of detector 28 is proportional to $\cos^2\theta$ and the output D2 of detector 30 is proportional to $\sin^2\theta$, where θ is the rotational orientation of moving platform 18 with respect to the predefined coordinate system. Thus, rotational orientation θ is given by:

$$\theta = \cos^{-1}\sqrt{\frac{D1}{D1+D2}}.$$

Figure 1B:
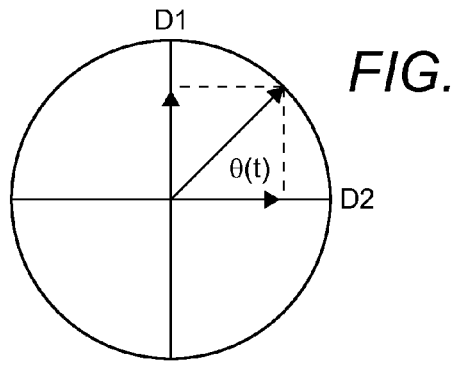
FIG. 1b is a diagram illustrating the components making up the rotational orientation value θ.

A simplification or an approximation of this expression might also be used. The components making up θ are illustrated in FIG. 1b.

Ellipsometric detector 20 may optionally include a collecting lens 32, located between polarizing beamsplitter 22 and transmitter 12 and arranged to concentrate beam 14 onto the detectors.

The present system provides a number of benefits. Establishing a free space link between the transmitter and moving platform as described herein provides a connection that is robust, even in an extremely turbulent environment. This is further aided by the use of polarization as a means to determine orientation, as polarization is not affected by atmospheric turbulence and scattering. The use of ellipsometric detection is also beneficial, as this helps to mitigate signal fades. The use of a low divergence optical beam (as when the optical beam is a linearly polarized laser beam) enables the system to operate covertly and at low emitted power, as well as packaged compactly and provided at a low cost.

A phase-locked-loop (PLL) circuit (not shown) may be coupled to ellipsometric detector 20 and arranged to track the moving platform's rotational orientation and thereby mitigate the degradation in the accuracy of the rotational orientation determination that might otherwise occur when the optical link is disrupted.

Figure 2:
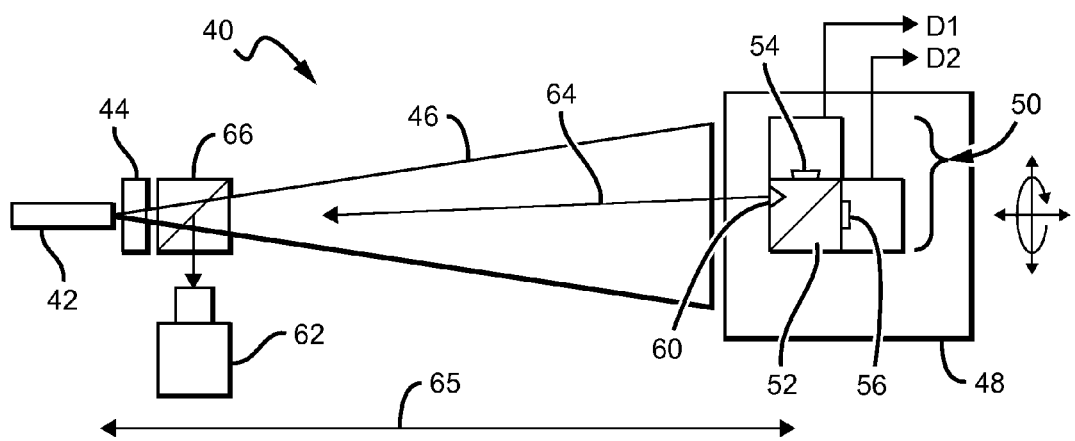
FIG. 2 is a block diagram of another embodiment of an orientation measurement system in accordance with the present invention.

Another possible embodiment of an orientation measurement system per the present invention is shown in FIG. 2. Here, the system 40 employs a laser 42 as a transmitter, the output of which is directed through a polarizer 44 to create a linearly polarized optical beam 46. Moving platform 48 includes a ellipsometric detector 50 which detects optical beam 46; the detector includes a polarizing beamsplitter 52 and first and second detectors 54, 56. As above, polarizing beamsplitter 52 outputs first and second components having orthogonal polarizations, the amplitudes of which vary with the polarization state of the detected beam. Detectors 54, 56 are arranged to receive the first and second orthogonal components and to generate respective outputs (D1, D2) that vary with the intensities of their received components, with D1+D2 being approximately equal to the total amplitude of the detected beam.

Moving platform 48 may also include an optical reflector 60—preferably a retroreflector—arranged to reflect the polarized beam. The system can then further include a detector 62, preferably near the transmitter, arranged to receive the reflected beam 64. Circuitry (not shown) coupled to detector 62 may be arranged to determine the range 65 of moving platform 48 with respect to transmitter 42. Note that detector 62 might be a component of a camera, and/or an array of detectors with which the platform's x and y coordinates can be determined. In this description, a Cartesian coordinate system is used in which the z axis is along the line between the transmitter to the moving platform (as indicated by line 65 in FIG. 2), and the platform's x and y coordinates are in the plane that contains the platform and are perpendicular to the z axis. The x and y axes correspond to the D1 and D2 directions, respectively, shown in FIG. 1b.

One way in which this might be accomplished is illustrated in FIG. 2. A beamsplitter 66, is placed between transmitter 42 and detector 62, and arranged to allow polarized beam 46 to be transmitted to moving platform 48, and to direct reflected beam 64 onto the detector. For high optical efficiency, beamsplitter 66 is preferably a spatial beamsplitter such as a mirror which contains a hole (not shown) through which the transmitted beam can pass.

The polarized beam 46 is then pulsed, and a means of timing is provided which measures the transit time of the pulses from transmitter 42 to moving platform 48 and back to detector 62, such that the range 65 of the moving platform with respect to the transmitter can be determined based on the transit time. Note that the beam generated by some lasers is inherently polarized, in which case it may be possible to eliminate the need for discrete polarizer 44.

Figure 3:
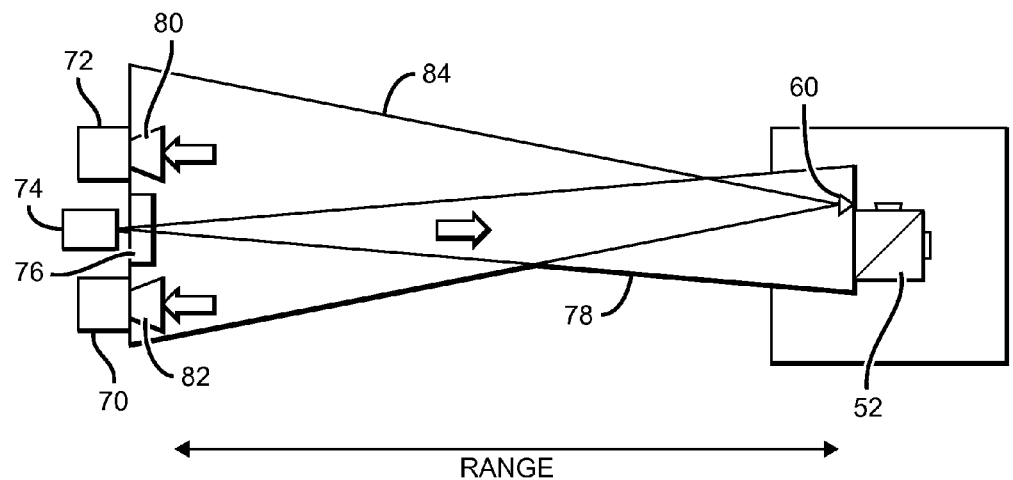
FIG. 3 is a block diagram of another embodiment of an orientation measurement system in accordance with the present invention.

An alternative embodiment is shown in FIG. 3. Here a rangefinding detector 70 and an array of detectors or a camera 72 might be located immediately adjacent to an transmitter 74, thereby eliminating the need for beamsplitter 66. When so arranged, instead of a shared single transmit/receive aperture as in FIG. 2, there is effectively only one transmit aperture 76 through which transmitted beam 78 passes, and two receive apertures 80, 82 through which the retroreflected beam 84 passes. This arrangement is possible because the retroreflected beam diverges as it travels from the platform and typically produces a large spot at the transmitter. (Note that divergence is exaggerated in FIG. 3; the range is much longer in practice.) Use of both a rangefinding detector and a camera as shown in FIG. 3 is preferred: data from the rangefinding detector enables the system to accurately determine the range of the platform (i.e., in the 'z' direction), while data from the array of detectors or camera enables the system to determine the platform's x and y coordinates.

Figure 4:
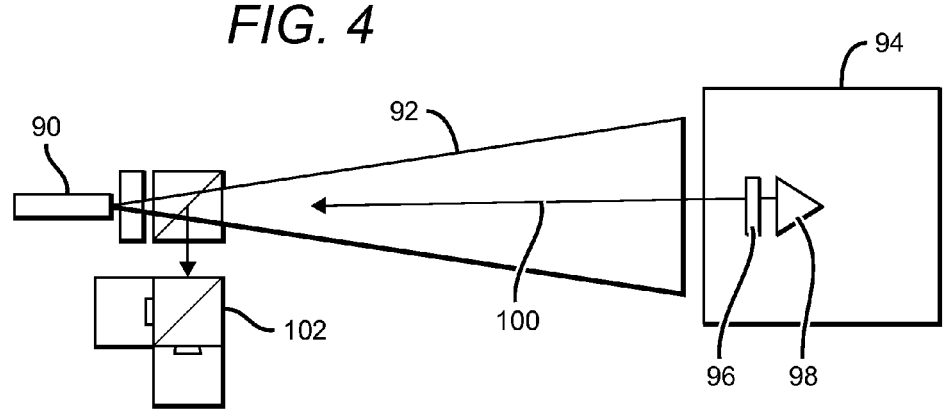
FIG. 4 is a block diagram of another embodiment of an orientation measurement system in accordance with the present invention.

Another possible embodiment is shown in FIG. 4. Here, the transmitter 90 launches an unpolarized or circularly polarized beam 92, and the platform 94 passively encrypts its orientation information on the polarization and reflects the beam. This is accomplished with, for example, a polarizer 96 mounted in front of a retroreflector 98 on platform 94, such that the polarization of the reflected beam 100 represents the platform orientation angle. Alternatively, beam 92 can be polarized and a quarter wave plate may be used in place of polarizer 96. In this embodiment, the ellipsometer 102 and (if used) the PLL (not shown) are located by transmitter 90 and not on the moving platform. This provides an advantage in that the design of the moving platform is simplified; however, the optical link is now 2× longer than in the previously-discussed embodiments.

The present system may be further arranged to convey guidance commands to the moving platform via the polarized beam. For example, transmitter 42 might be arranged to encode guidance commands into beam 46 by pulsing the beam, using phase-modulation or pulse-position-modulation, for example. The moving platform may then be arranged to detect and decode the pulses—using the 'sum' signal produced by ellipsometric detector 50, for example—and thereby detect the guidance commands. The moving platform can be arranged to vary its trajectory in response to the guidance commands it receives.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A moving platform orientation measurement system, comprising:
   a transmitter which generates a beam of electromagnetic radiation which is unpolarized or which has a circular polarization;
   a moving platform;
   a reflector mounted on said platform and arranged to reflect said beam;
   a polarizer mounted in front of said reflector; and
   an ellipsometric detector proximate to said transmitter, capable of detecting said reflected beam when within said reflected beam's line-of-sight and measuring its polarization state, the polarization of said reflected beam varying with the platform's rotational orientation;
   wherein said ellipsometric detector comprises:
      a polarizing beamsplitter which splits a detected polarized beam into first and second components having orthogonal polarizations, the amplitudes of which vary with the polarization state of said detected beam;
      first and second detectors arranged to receive said first and second components having orthogonal polarizations from said polarizing beamsplitter, respectively, and to generate respective outputs, wherein the output D1 of said first detector is proportional to $\cos^2\theta$ and the output D2 of said second detector is proportional to $\sin^2\theta$, where $\theta$ is the rotational orientation of said moving platform with respect to a predefined coordinate system, with $\theta$ approximately given by:

$$\theta = \cos^{-1}\sqrt{\frac{D1}{D1+D2}},$$

and circuitry which receives said detector outputs and determines said platform's rotational orientation based on said detector outputs.

2. The system of claim 1, further comprising a collecting lens located between said polarizing beamsplitter and said reflected beam and arranged to concentrate said detected beam onto said detectors.

3. The system of claim 1, wherein a free space link is established between said transmitter, said moving platform, and said ellipsometric detector when said ellipsometric detector is within the line-of-sight of said reflected beam, further comprising a phase-locked-loop (PLL) circuit coupled to said ellipsometric detector and arranged to track said rotational orientation and thereby mitigate the degradation in the accuracy of said rotational orientation determination that might otherwise occur when said optical link is disrupted.

4. The system of claim 1, said system further comprising a detector, an array of detectors, and/or a camera arranged to receive said reflected beam.

5. The system of claim 1, wherein said reflector is a retroreflector.

6. The system of claim 4, further comprising a beamsplitter located between said transmitter and said detector, said array of detectors, and/or said camera, said system arranged with no additional optical elements between said beamsplitter and said moving platform such that said transmitted beam is directly conveyed from said beamsplitter to said moving platform and said reflected beam is directly conveyed from said beamsplitter to said detector, said array of detectors, and/or said camera detector.

7. The system of claim 6, wherein said beamsplitter located between said transmitter and said detector, said array of detectors, and/or said camera is a spatial beamsplitter.

8. The system of claim 4, further comprising a rangefinding detector, said system arranged such that data from said rangefinding detector is used to determine the range (z coordinate) of said moving platform.

9. The system of claim 4, wherein said detector, said array of detectors, and/or said camera comprise an array of detectors or a camera, said system arranged such that data from said array of detectors or said camera is used to determine the x and y coordinates of said moving platform.

10. The system of claim 4, wherein said beam is pulsed, further comprising a means of timing the transit time of said pulses from said transmitter to said moving platform and back to said detector, said array of detectors, and/or said camera such that the range of said moving platform with respect to said transmitter can be determined based on said transit time.

11. The system of claim 1, wherein said transmitter comprises:
a laser which produces a laser beam; and
a polarizer which circularly polarizes said laser beam.

12. The system of claim 1, wherein said transmitter is arranged to encode guidance commands into said beam by pulsing said beam, said moving platform arranged to detect and decode said pulses and thereby detect said guidance commands.

13. The system of claim 1, wherein said moving platform is arranged to receive guidance commands via said beam and to vary its trajectory in response to said guidance commands.

14. A method of guiding a moving platform, comprising:
transmitting a beam of electromagnetic radiation;
receiving said beam at said moving platform and encrypting the rotational orientation of said moving platform on said beam in the form of beam polarization;
reflecting said encrypted beam from said moving platform;
providing a polarizing beamsplitter;
detecting said reflected beam by using said polarizing beamsplitter to split said polarized beam into first and second components having orthogonal polarizations, the amplitudes of which vary with the polarization state of said detected beam;
generating first and second outputs,
wherein said first output D1 is proportional to $\cos^2\theta$ and said second output D2 is proportional to $\sin^2\theta$, where $\theta$ is the rotational orientation of said moving platform with respect to a predefined coordinate system, with $\theta$ approximately given by:

$$\theta = \cos^{-1}\sqrt{\frac{D1}{D1+D2}};$$

and
determining said moving platform's rotational orientation based on said first and second outputs.

15. The method of claim 14, further comprising:
determining the range of said moving platform based on the transit time of said transmitted and reflected beam.

16. The method of claim 15, further comprising imaging said reflected beam and determining the x and y coordinates of said moving platform based on said imaging.

17. The method of claim 14, further comprising:
pulsing said transmitted beam;
determining the range of said moving platform by measuring the transit time of said pulses to and from said moving platform.

18. The method of claim 17, further comprising:
encoding guidance commands into said beam by pulsing said beam; and
detecting and decoding said pulses at said moving platform and thereby detect said guidance commands.

19. A moving platform guidance system, comprising:
a transmitter which generates a pulsed beam of electromagnetic radiation which is unpolarized or which has a circular polarization;
a moving platform;
a reflector on said moving platform arranged to reflect said pulsed beam;
a polarizer mounted in front of said reflector;
a detector arranged to receive said reflected beam;
a means of timing the transit time of said pulses from said transmitter to said moving platform and back to said detector such that the range of said moving platform with respect to said transmitter can be determined based on said transit time;

an ellipsometric detector proximate to said transmitter, capable of detecting said reflected beam when within said detector's line-of-sight and measuring its polarization state, the polarization of said reflected beam varying with the platform's rotational orientation;

wherein said ellipsometric detector comprises:

a polarizing beamsplitter which splits a detected polarized beam into first and second components having orthogonal polarizations, the amplitudes of which vary with the polarization state of said detected beam; and first and second detectors arranged to receive said first and second components having orthogonal polarizations from said polarizing beamsplitter, respectively, and to generate respective outputs, wherein the output D1 of said first detector is proportional to $\cos^2\theta$ and the output D2 of said second detector is proportional to $\sin^2\theta$, where $\theta$ is the rotational orientation of said moving platform with respect to a predefined coordinate system, with $\theta$ approximately given by:

$$\theta = \cos^{-1}\sqrt{\frac{D1}{D1+D2}};$$

circuitry which receives said detector outputs and determines said platform's rotational orientation based on said detector outputs; and a camera arranged to receive the reflected beam to determine the x, y coordinates of said moving platform;

said system arranged to encode guidance commands into said polarized pulsed beam, said moving platform arranged to detect and decode said pulses and thereby detect said guidance commands and to vary its trajectory in response to said guidance commands.

20. The system of claim 19, wherein said reflector is a retroreflector.

21. The method of claim 14, wherein said transmitted beam is unpolarized or circularly polarized, said moving platform comprising:

a reflector; and a polarizer mounted in front of said reflector;

said polarizer arranged to encrypt the rotational orientation of said moving platform on said beam prior to its being reflected.

22. The method of claim 14, wherein said transmitted beam is linearly polarized, said moving platform comprising:

a reflector; and a quarter wave plate mounted in front of said reflector which rotates said linear polarized beam by $2\theta$, where $\theta$ is the rotational orientation of said moving platform with respect to a predefined coordinate system;

said quarter wave plate arranged to encrypt the rotational orientation of said moving platform on said beam prior to its being reflected.

23. A moving platform orientation measurement system, comprising:

a transmitter which generates a beam of electromagnetic radiation having a known linear polarization with respect to a predefined coordinate system;

a moving platform;

a reflector mounted on said platform and arranged to reflect said beam;

a quarter wave plate mounted in front of said reflector which rotates said linear polarized beam by $2\theta$, where $\theta$ is the rotational orientation of said moving platform with respect to a predefined coordinate system; and an ellipsometric detector proximate to said transmitter, capable of detecting said reflected beam when within said detector's line-of-sight and measuring its polarization state, the polarization of said reflected beam varying with the platform's rotational orientation;

wherein said ellipsometric detector comprises:

a polarizing beamsplitter which splits a detected polarized beam into first and second components having orthogonal polarizations, the amplitudes of which vary with the polarization state of said detected beam;

first and second detectors arranged to receive said first and second components having orthogonal polarizations, respectively, and to generate respective outputs; and circuitry which receives said detector outputs and determines said platform's rotational orientation based on said detector outputs.

24. The system of claim 23, wherein a free space link is established between said transmitter, said reflector and said ellipsometric detector when said ellipsometric detector is within the line-of-sight of said reflected polarized beam, further comprising a phase-locked-loop (PLL) circuit coupled to said ellipsometric detector and arranged to track said rotational orientation and thereby mitigate the degradation in the accuracy of said rotational orientation determination that might otherwise occur when said link is disrupted.

25. A moving platform orientation measurement system, comprising:

a transmitter which generates a beam of electromagnetic radiation which is unpolarized or which has a circular polarization;

a moving platform;

a reflector mounted on said platform and arranged to reflect said beam;

a polarizer mounted in front of said reflector;

an ellipsometric detector proximate to said transmitter, capable of detecting said reflected beam when within said reflected beam's line-of-sight and measuring its polarization state, the polarization of said reflected beam varying with the platform's rotational orientation, wherein said ellipsometric detector comprises:

a polarizing beamsplitter which splits a detected polarized beam into first and second components having orthogonal polarizations, the amplitudes of which vary with the polarization state of said detected beam;

first and second detectors arranged to receive said first and second components having orthogonal polarizations from said polarizing beamsplitter, respectively, and to generate respective outputs, wherein the output D1 of said first detector is proportional to $\cos^2\theta$ and the output D2 of said second detector is proportional to $\sin^2\theta$, where $\theta$ is the rotational orientation of said moving platform with respect to a predefined coordinate system, with $\theta$ approximately given by:

$$\theta = \cos^{-1}\sqrt{\frac{D1}{D1+D2}};$$

circuitry which receives said detector outputs and determines said platform's rotational orientation based on said detector outputs;
a detector, an array of detectors, and/or a camera arranged to receive said reflected beam; and
a beamsplitter located between said transmitter and said detector, said array of detectors, and/or said camera and arranged to allow the transmitter and said detector, said array of detectors, and/or said camera detector to share the same optical aperture.

26. A moving platform orientation measurement system, comprising:
a transmitter which generates a beam of electromagnetic radiation which is unpolarized or which has a circular polarization;
a moving platform;
a reflector mounted on said platform and arranged to reflect said beam;
a polarizer mounted in front of said reflector;
an ellipsometric detector proximate to said transmitter, capable of detecting said reflected beam when within said reflected beam's line-of-sight and measuring its polarization state, the polarization of said reflected beam varying with the platform's rotational orientation;
wherein said ellipsometric detector comprises:
a polarizing beamsplitter which splits a detected polarized beam into first and second components having orthogonal polarizations, the amplitudes of which vary with the polarization state of said detected beam; and
first and second detectors arranged to receive said first and second components having orthogonal polarizations, respectively, and to generate respective outputs that vary with the intensities of their received components, said detector outputs used to determine said platform's rotational orientation;
a detector, an array of detectors, and/or a camera arranged to receive said reflected beam; and
a rangefinding detector, said system arranged such that data from said rangefinding detector is used to determine the range (z coordinate) of said moving platform;
wherein said rangefinding detector and said detector, said array of detectors, and/or said camera are located immediately adjacent to said transmitter, said system arranged such that said transmitted beam is conveyed to said moving platform via a 'transmit' aperture and said reflected beam is conveyed to said rangefinding detector and to said detector, said array of detectors, and/or said camera via first and second 'receive' apertures, respectively, said transmit aperture and said first and second receive apertures being spatially distinct from each other.

* * * * *